May 16, 1950     G. S. TRIMBLE, JR     2,507,741
UPPER HINGED AILERON
Filed Feb. 14, 1948
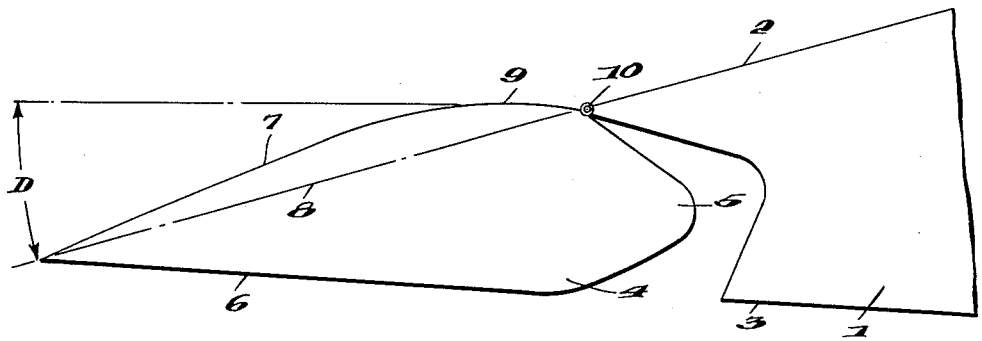
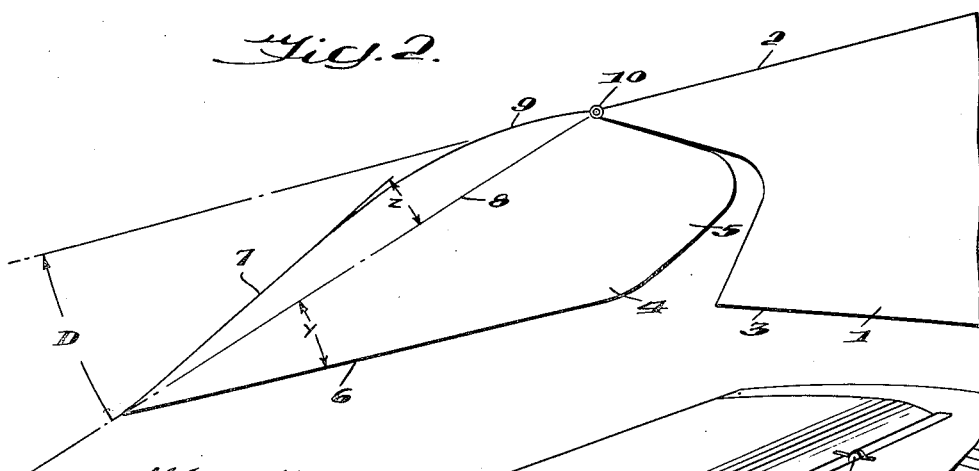
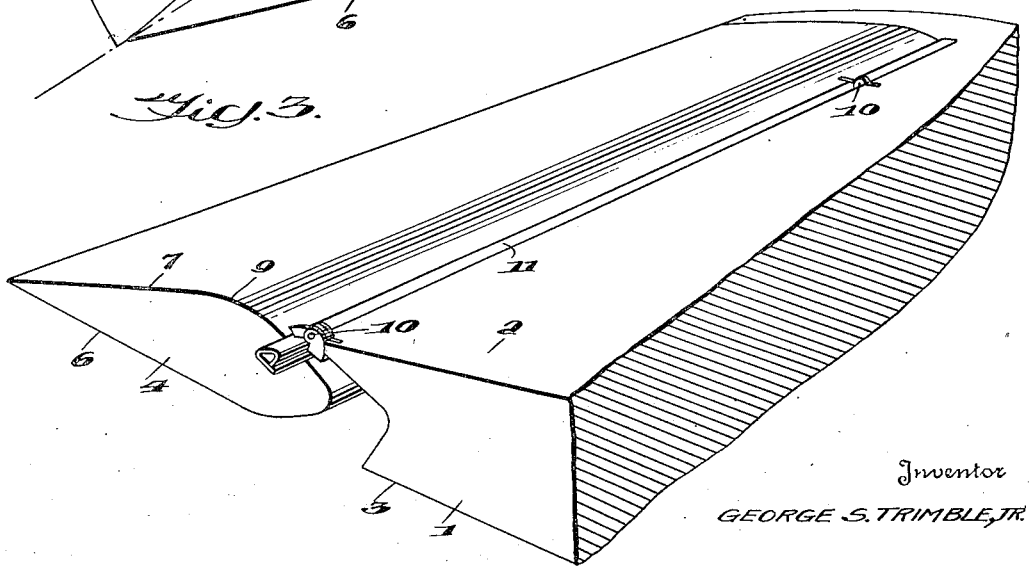
Inventor
GEORGE S. TRIMBLE, JR.
By Donald W. Farrington
Attorney Patented May 16, 1950

2,507,741

UNITED STATES PATENT OFFICE 2,507,741

UPPER HINGED AILERON

George S. Trimble, Jr., Towson, Md., assignor to The Glenn L. Martin Company, Middle River, Md., a corporation of Maryland Application February 14, 1948, Serial No. 8,442

4 Claims. (Cl. 244—90)

This invention relates to an improved aileron for an airplane wing, and more particularly for the type of aileron known as an upper hinged aileron.

An upper hinged aileron is one wherein the aileron is attached to the trailing edge of the wing by hinged brackets secured to the forward upper portion of the aileron and the trailing upper edge of the wing with the axes of the hinges lying approximately in the plane of the upper surface of the wing. It is usual that the upper and lower surfaces of the aileron conform to and complete the profile of the wing. That is, the lower surface of the aileron is generally coplanar with the lower surface of the trailing edge of the wing, and the upper surface is generally coplanar with the trailing edge of the upper surface of the wing. The upper hinged aileron offers a structural advantage in addition to the aerodynamic advantages, in that it can be attached to the trailing edge of the wing by brackets that are external of the wing and aileron structures. In other words, it is not necessary to cut the skin of the aileron structure to pivot the aileron at some point within the structure.

Upper hinged ailerons of the above described type have not been used particularly on high speed airplanes, that is, of a speed range of 300 to 400 miles per hour, because of undesirable aerodynamic characteristics that are obtained when the aileron is deflected downwardly. The sharp break between the planes of the upper surface of the aileron and the trailing edge of the wing gives undesirable aerodynamic characteristics.

It is an object of this invention to provide an aileron of the upper hinged type wherein the upper surface is formed to provide good aerodynamic characteristics for all positions of the aileron including the maximum down deflection.

Further and other objects will become apparent from the description of the accompanying drawings which form a part of this disclosure and in which like numerals refer to like parts.

In the drawings:

Figure 1 is a fragmentary sectional view showing the improved aileron in relation to the wing.

Figure 2 shows the aileron of Figure 1 in the position of maximum down deflection.

Figure 3 is a perspective view showing the aileron attached to the trailing edge of the wing.

The drawings illustrate a wing generally shown as 1 having a trailing edge, upper surface 2, and a trailing edge, lower surface 3. The aileron 4 has a nose portion 5, a lower surface portion 6 and an upper surface portion 7. The nose portion 5 can be of any desired contour, but it is usual that it is so formed that for all "up" deflection positions of the aileron it remains above the plane of surface 3 extended. Surface 6 of the aileron lies substantially in the plane of surface 3 extended for the neutral position of the aileron. In a conventional upper hinged aileron, the upper surface would ordinarily be formed by a surface in the plane of surface 2 extended, as shown by line 8. It can readily be seen for a downward deflection of the aileron of angle D that with the conventional aileron, a sharp break occurs between the upper surface of the aileron and the wing, which in a high speed wing gives undesirable aerodynamic characteristics for the aileron.

The aileron of this invention has the upper surface 7 formed with a smooth, curved, convex contour. The forward portion 9 of surface 7 is formed in a cylindrical, curved plane that extends substantially through the hinge line, at the leading edge thereof, and is tangent to a plane passing approximately through the hinge line that forms an angle D with the plane of surface 2 of the wing extended when the aileron is in the neutral position, which angle corresponds to the maximum down deflection of the aileron. In other words, the forward portion of the upper surface of the aileron adjacent the hinge line is formed by a curve, tangent to a plane through the hinge line, which is coplanar with the trailing edge, upper surface of the wing when the aileron is in the maximum down position. This is illustrated in Figure 2. The convex upper contour at the trailing edge meets the lower surface of the aileron in a sharp edge in the conventional manner. The angular thickness of the aileron with the improved upper surface is maintained so that the increase in angular thickness over the conventional aileron is about one-half, or less, of the angle at the trailing edge between the extensions of the planes of the upper and lower surfaces of the wing. This is illustrated in the drawings. Angle Y represents the usual angular extent of the trailing edge of the aileron which is formed by the extension of surfaces 2 and 3. When the forward portion of the upper surface of the aileron is contoured as described above, the trailing portion of the aileron is formed by a plane that is faired into the forward curved portion of the upper surface and forms a wedge-shaped trailing portion with the lower surface. The angular increase of the trailing edge, shown by angle Z, over the normal angular extent Y, should be kept within fifty percent (50%) of Y.

Figure 3 shows a typical installation of the upper hinged aileron 4 secured to wing 1 by a plurality of hinges 10. The space between the aileron and the wing adjacent the hinge line is filled by a seal 11 that prevents the flow of air from underneath the wing to the upper surface of the wing. It is necessary that no air pass from below the wing to the upper surface of the wing through this gap to distort the air flow over the upper surface of the wing and aileron for optimum aileron control. It will be noted that in the neutral position, surface 7 extends slightly above the plane of the upper surface of the wing but due to the smooth, convex curvature, it does not affect the high speed characteristics of the wing.

It is to be understood that certain changes, alterations, modifications and substitutions may be made without departing from the spirit and scope of the appended claims.

I claim as my invention:

1. An aileron for an airplane wing having a plurality of hinges to secure said aileron to said wing for movement with respect thereto, the axes of said hinges forming a hinge line lying approximately in the plane of the upper surface of said wing, sealing means extending between said hinges to prevent air flow from the underside to the upper surface of the wing, the upper side of said aileron being formed by a convex surface, the forward portion of said convex surface adjacent the hinge line being tangent to a reference plane passing approximately through the hinge line, said reference plane being coplanar with the upper surface of the wing at the trailing edge when the aileron is in the down position.

2. An aileron for an airplane wing having a plurality of hinges to secure said aileron to said wing for movement with respect thereto, the axes of said hinges forming a hinge line lying approximately in the plane of the upper surface of said wing, sealing means extending between said hinges to prevent air flow from the underside to the upper surface of the wing, the upper side of said aileron being formed by a convex surface, the forward portion of said convex surface adjacent the hinge line being tangent to a reference plane passing approximately through the hinge line, said reference plane being coplanar with the upper surface of the wing at the trailing edge when the aileron is in the down position, the trailing edge of said aileron being wedge shaped and faired into said convex forward portion.

3. An aileron for an airplane wing having a plurality of hinges to secure said aileron to said wing for movement with respect thereto, the axes of said hinges forming a hinge line lying approximately in the plane of the upper surface of said wing, sealing means extending between said hinges to prevent air flow from the underside to the upper surface of the wing, the upper side of said aileron being formed by a smooth, curved, convex surface, the forward portion of said convex surface adjacent the hinge line being tangent to a reference plane passing approximately through the hinge line, said reference plane being coplanar with the upper surface of the wing at the trailing edge when the aileron is in the down position, the trailing edge of said aileron being wedge shaped and faired into said convex forward portion, the angular extent of said wedge being between 100 and 150 percent of the angle at the trailing edge formed by the upper and lower surfaces of the planes of the trailing edge of the wing extended.

4. An upper hinged aileron for an airplane wing having a plurality of hinge brackets to secure said aileron to said wing for movement with respect thereto, the axes of said hinges lying approximately in the plane of the upper surface of said wing, said aileron having a rounded nose portion and a lower portion extending substantially coplanar with the lower surface of the wing when the aileron is in neutral position, said aileron having a convex upper surface fairing into said rounded nose portion and a wedge-shaped trailing edge, said convex upper surface formed by a curved plane passing approximately through the hinge line and extending above the plane of the upper surface of the wing when the aileron is in the neutral position, the curved upper surface of the aileron being tangent to a reference plane passing approximately through the hinge line, making an angle with the plane of the upper surface of the wing, extending rearwardly of the hinge line, equal to the angle of maximum down deflection of the aileron.

GEORGE S. TRIMBLE, Jr.

REFERENCES CITED

The following references are of record in the file of this patent:

UNITED STATES PATENTS

| Number | Name | Date |
| --- | --- | --- |
| 1,785,620 | Frise | Dec. 16, 1930 |
| 1,817,281 | Williams | Aug. 4, 1931 |
| 2,403,770 | Van Zelm | July 9, 1946 |